US012750433B2

(12) United States Patent
Qiao et al.

(10) Patent No.: US 12,750,433 B2
(45) Date of Patent: Sep. 29, 2026

(54) CDN NODE ALLOCATION METHOD AND APPARATUS, ELECTRONIC DEVICE, MEDIUM AND PROGRAM PRODUCT

(71) Applicant: Beijing Bytedance Network Technology Co., Ltd., Beijing (CN)

(72) Inventors: Chunyu Qiao, Beijing (CN); Darui Wang, Beijing (CN); Shengbin Meng, Beijing (CN); Qian Ma, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 16 days.

(21) Appl. No.: 18/713,922

(22) PCT Filed: Nov. 2, 2022

(86) PCT No.: PCT/CN2022/129267
§ 371 (c)(1),
(2) Date: May 28, 2024

(87) PCT Pub. No.: WO2023/116219
PCT Pub. Date: Jun. 29, 2023

(65) Prior Publication Data

US 2025/0039278 A1 Jan. 30, 2025

(30) Foreign Application Priority Data

Dec. 20, 2021 (CN) ......................... 202111562887.X

(51) Int. Cl.
*G06F 15/16* (2006.01)
*G06F 9/54* (2006.01)
(Continued)

(52) U.S. Cl.
CPC .................................... *H04L 67/61* (2022.05)

(58) Field of Classification Search
CPC .. H04L 67/61; G06F 9/50; G06N 3/04; G06N 3/08
(Continued)

(56) References Cited

U.S. PATENT DOCUMENTS 9,407,570 B2 * 8/2016 Guo ........................ H04L 47/70
9,497,243 B1 * 11/2016 Binns .................. G06N 3/0499
(Continued)

FOREIGN PATENT DOCUMENTS

CN 105898402 A * 8/2016 ....... H04N 21/26208
CN 106231365 A 12/2016
(Continued)

OTHER PUBLICATIONS

International Search Report and Written Opinion received for PCT Patent Application No. PCT/CN2022/129267, mailed on Jan. 13, 2023, 10 pages (2 pages of English Translation and 8 pages of Original Document).
(Continued)

*Primary Examiner* — Hamza N Algibhah

(57) ABSTRACT

The present application relates to a CDN node allocation method and apparatus, an electronic device, a medium and a program product, which are applied to the technical field of the Internet. The method includes: acquiring a target physical scene corresponding to a target network request; determining, according to the target physical scene and a pre-established node quality score table, target quality scores of a plurality of types of CDN nodes corresponding to the target physical scene; evaluating the quality of the plurality of types of CDN nodes according to the target quality scores of the plurality of types of CDN nodes to obtain a quality evaluation result; and selecting, according to the number of nodes corresponding to a plurality of types of candidate CDN nodes in a candidate CDN node set and the
(Continued)

quality evaluation result, a CDN node of a target type from the candidate CDN node set.

19 Claims, 4 Drawing Sheets

(51) Int. Cl.
*H04L 29/06* (2006.01)
*H04L 67/61* (2022.01)

(58) Field of Classification Search
USPC .............................................. 726/23; 709/226
See application file for complete search history.

(56) References Cited

U.S. PATENT DOCUMENTS

| | | | | |
|---|---|---|---|---|
| 9,544,346 | B1 * | 1/2017 | Chakrovorthy | H04L 43/08 |
| 10,038,758 | B1 * | 7/2018 | Richter | H04L 47/25 |
| 10,523,742 | B1 * | 12/2019 | Hanifen | G06F 16/955 |
| 2014/0344331 | A1 * | 11/2014 | Johns | H04L 67/60<br>709/203 |
| 2017/0142177 | A1 * | 5/2017 | Hu | H04L 67/1023 |
| 2019/0156196 | A1 | 5/2019 | Zoldi et al. | |
| 2021/0224136 | A1 | 7/2021 | Sevim et al. | |
| 2022/0116316 | A1 * | 4/2022 | Kisa | H04L 45/70 |

FOREIGN PATENT DOCUMENTS

| | | | | | |
|---|---|---|---|---|---|
| CN | 103312629 | B | * | 2/2018 | H04L 47/70 |
| CN | 107911722 | A | * | 4/2018 | H04N 21/26225 |
| CN | 108306769 | A | * | 7/2018 | H04L 67/1001 |
| CN | 108563499 | A | | 9/2018 | |
| CN | 109802847 | A | | 5/2019 | |
| CN | 106034330 | B | * | 8/2019 | H04W 75/52 |
| CN | 110636339 | A | | 12/2019 | |
| CN | 110708256 | A | | 1/2020 | |
| CN | 110891077 | A | * | 3/2020 | H04L 67/61 |
| CN | 110944061 | A | * | 3/2020 | H04L 67/63 |
| CN | 107911722 | B | * | 6/2020 | H04N 21/2408 |
| CN | 109831511 | B | * | 10/2020 | H04L 67/63 |
| CN | 111901425 | A | | 11/2020 | |
| CN | 111901425 | B | * | 5/2021 | H04L 67/63 |
| CN | 112749974 | A | | 5/2021 | |
| CN | 113099261 | A | * | 7/2021 | H04L 61/4511 |
| CN | 108306769 | B | * | 8/2021 | H04L 67/1001 |
| CN | 113505854 | A | | 10/2021 | |
| CN | 113810450 | A | * | 12/2021 | H04L 67/1008 |
| CN | 114268672 | A | | 4/2022 | |
| CN | 115766870 | A | * | 3/2023 | |
| CN | 116137624 | A | * | 5/2023 | H04L 61/10 |
| EP | 4047890 | A1 | * | 8/2022 | H04L 67/025 |
| TR | 201811297 | A2 | * | 8/2018 | G06F 9/5077 |
| WO | 2016/145753 | A1 | | 9/2016 | |
| WO | 2017/080172 | A1 | | 5/2017 | |
| WO | 2020/168957 | A1 | | 8/2020 | |

OTHER PUBLICATIONS

Notification of Grant received for CN Patent Application No. 202111562887.X, Issued on Dec. 12, 2023, 8 pages (4 pages English Translation and 4 pages Original Copy).

Office action received from Chinese patent application No. 202111562887.X mailed on Jul. 6, 2023, 17 pages (9 pages English Translation and 8 pages Original Copy).

* cited by examiner

CDN NODE ALLOCATION METHOD AND APPARATUS, ELECTRONIC DEVICE, MEDIUM AND PROGRAM PRODUCT

CROSS-REFERENCE TO RELATED APPLICATIONS

This application is a U.S. National Stage under 35 U.S.C. § 371 of International Application No. PCT/CN2022/129267. as filed on Nov. 2, 2022, which is based on and claims the priority to the Chinese patent application No. 202111562887.X entitled "CDN NODE ALLOCATION METHOD AND APPARATUS, ELECTRONIC DEVICE, MEDIUM AND PROGRAM PRODUCT" filed on Dec. 20, 2021, is closure of each of these applications is incorporated by reference herein in its entirety.

TECHNICAL FIELD

The present application relates to the technical field of the Internet, and in particular, to a CDN node allocation method and apparatus, an electronic device, a medium, and a program product.

BACKGROUND

A content delivery network (CDN) allows users to obtain required contents nearby based on edge servers disposed in various regions and through load balancing, content delivery, scheduling, and other functional modules of a central platform, so as to reduce network congestion and improve user access response speed and hit rate.

SUMMARY

In accordance with a first aspect of the present application, there is provided a CDN node allocation method, comprising:

- acquiring a target physical scene corresponding to a target network request;
- determining, in accordance with the target physical scene and a pre-established node quality score table, target quality scores of a plurality of types of CDN nodes corresponding to the target physical scene, wherein the node quality score table comprises a mapping relation between each of physical scenes and quality scores of the plurality of types of CDN nodes;
- evaluating a quality of the plurality of types of CDN nodes in accordance with the target quality scores of the plurality of types of CDN nodes to obtain a quality evaluation result; and
- selecting, in accordance with the numbers of nodes respectively corresponding to the plurality of types of candidate CDN nodes in a candidate CDN node set and the quality evaluation result, a CDN node of a target type from the candidate CDN node set, wherein the candidate CDN node of the target type has the highest quality.

Optionally, the method further comprises:

- acquiring a plurality of pieces of historical network data, the physical scene corresponding to a single piece of the historical network data, and the type of the CDN node corresponding to the single piece of the historical network data;
- determining, in accordance with the single piece of the historical network data, the quality score of the CDN node of the type corresponding to the single piece of the historical network data; and
- establishing a mapping relation between the physical scene corresponding to the single piece of the historical network data and the quality score of the CDN node of the type corresponding to the historical network data to obtain the node quality score table.

Optionally, the historical network data comprises historical video data; and

- the determining, in accordance with the single piece of the historical network data, the quality score of the CDN node of the type corresponding to the single piece of the historical network data comprises:
- acquiring, in accordance with the single piece of the historical video data, a first screen time and/or a lag duration and/or the number of lags of the single piece of the historical video data; and
- determining, in accordance with the first screen time and/or the lag duration and/or the number of lags, the quality score of the CDN node of the type corresponding to the historical video data.

Optionally, the determining, in accordance with the first screen time, the lag duration, and the number of lags, the quality score of the CDN node of the type corresponding to the historical video data comprises:

- performing weighted average on the first screen time, the lag duration, and the number of lags to obtain the quality score of the CDN node of the type corresponding to the historical video data; or,
- processing, based on a pre-trained neural network score model, the first screen time, the lag duration, and the number of lags to obtain the quality score of the CDN node of the type corresponding to the historical video data.

Optionally, the method further comprises:

- removing the selected candidate CDN node of the target type from the candidate CDN node set; and
- determining a current network request as the target network request, and returning to the step of acquiring a target physical scene corresponding to a target network request, until a total number of the candidate CDN nodes is 0.

Optionally, the method further comprises:

- determining, in accordance with overall quality of the plurality of types of CDN nodes and cost information of the plurality of types of CDN nodes, the numbers of nodes respectively corresponding to the plurality of types of candidate CDN nodes in the candidate CDN node set.

Optionally, the method further comprises:

- acquiring requested data corresponding to the target network request through the CDN node of the target type, and returning the requested data to a terminal device.

Optionally, the target network request is a video playing request, and the target physical scene corresponding to the target network request comprises one or more of video popularity, a video bitrate, a startup type, a network type, and a network operator.

In accordance with a second aspect of the present application, there is provided a CDN node allocation apparatus, comprising:

- a target physical scene acquisition module configured to acquire a target physical scene corresponding to a target network request;
- a target quality score determination module configured to determine, in accordance with the target physical scene and a pre-established node quality score table, target quality scores of a plurality of types of CDN nodes corresponding to the target physical scene, wherein the node quality score table comprises a mapping relation between each of physical scenes and quality scores of the plurality of types of CDN nodes;

a CDN node quality evaluation module configured to evaluate a quality of the plurality of types of CDN nodes in accordance with the target quality scores of the plurality of types of CDN nodes to obtain a quality evaluation result; and a candidate CDN node determination module configured to select, in accordance with the numbers of nodes respectively corresponding to the plurality of types of candidate CDN nodes in a candidate CDN node set and the quality evaluation result, a CDN node of a target type from the candidate CDN node set, wherein the candidate CDN node of the target type has the highest quality.

Optionally, the CDN node allocation apparatus further comprises:

a data acquisition module configured to acquire a plurality of pieces of historical network data, the physical scene corresponding to a single piece of the historical network data, and the type of the CDN node corresponding to the single piece of the historical network data;

a quality score determination module configured to determine, in accordance with the single piece of the historical network data, the quality score of the CDN node of the type corresponding to the single piece of the historical network data; and a node quality score table generation module configured to establish a mapping relation between the physical scene corresponding to the single piece of the historical network data and the quality score of the CDN node of the type corresponding to the historical network data to obtain the node quality score table.

Optionally, the historical network data comprises historical video data; and the quality score determination module is specifically configured to acquire, in accordance with the single piece of the historical video data, a first screen time and/or a lag duration and/or the number of lags of the single piece of the historical video data; and determine, in accordance with the first screen time and/or the lag duration and/or the number of lags, the quality score of the CDN node of the type corresponding to the historical video data.

Optionally, the quality score determination module determines the quality score of the CDN node of the type corresponding to the historical video data in accordance with the first screen time, the lag duration, and the number of lags by the steps of:

performing weighted average on the first screen time, the lag duration, and the number of lags to obtain the quality score of the CDN node of the type corresponding to the historical video data; or, processing, based on a pre-trained neural network score model, the first screen time, the lag duration, and the number of lags to obtain the quality score of the CDN node of the type corresponding to the historical video data.

Optionally, the CDN node allocation apparatus further comprises:

a node removal module configured to remove the selected candidate CDN node of the target type from the candidate CDN node set; and a loop module configured to determine a current network request as the target network request and return to the target physical scene acquisition module until a total number of the candidate CDN nodes is 0.

Optionally, the CDN node allocation apparatus further comprises:

a node number determination module configured to determine, in accordance with overall quality of the plurality of types of CDN nodes and cost information of the plurality of types of CDN nodes, the numbers of nodes respectively corresponding to the plurality of types of candidate CDN nodes in the candidate CDN node set.

Optionally, the CDN node allocation apparatus further comprises:

a requested data acquisition module configured to acquire requested data corresponding to the target network request through the CDN node of the target type; and a requested data transmission module configured to return the requested data to a terminal device.

Optionally, the target network request is a video playing request, and the target physical scene corresponding to the target network request comprises one or more of video popularity, a video bitrate, a startup type, a network type, and a network operator.

In accordance with a third aspect of the present application, there is provided an electronic device, comprising: a processor configured to execute a computer program stored in a memory, wherein the computer program, when executed by the processor, implements the method of the first aspect.

In accordance with a fourth aspect of the present application, there is provided a non-transitory computer-readable storage medium having stored thereon a computer program which, when executed by a processor, implements the method of the first aspect.

In accordance with a fifth aspect of the present application, there is provided a computer program product which, when executed on a computer, causes the computer to perform the method of the first aspect.

In accordance with a sixth aspect of the present application, there is provided a computer program which, when executed by a processor, implements the method of the first aspect.

BRIEF DESCRIPTION OF THE DRAWINGS

The accompanying drawings here, which are incorporated in and constitute a part of this specification, illustrate embodiments consistent with the present application and together with the description, serve to explain the principles of the present application.

In order to more clearly illustrate the embodiments of the present application or technical solutions in the related arts, the drawings that need to be used in the description of the embodiments or the related arts will be briefly discussed below, and for one of ordinary skill in the art, other accompanying drawings can be obtained in accordance with the drawings without paying out creative efforts.

DETAILED DESCRIPTION

In order that the above objectives, features, and advantages of the present application can be more clearly understood, the solutions of the present application will be further described below. It should be noted that the embodiments of the present application and features in the embodiments may be combined with each other without conflict.

In the following description, numerous specific details are set forth in order to provide a thorough understanding of the present application, but the present application may be implemented in other ways different from those described here; and it is apparent that the embodiments described in this description are only some of the embodiments of the present application, rather than all of them.

In the related arts, a CDN node may be selected based on loads and costs of the CDN nodes of different vendors. However, the CDN node selected based on this method cannot provide a high-quality network service for a user.

Compared with the related arts, the technical solutions provided in the embodiments of the present application have the following advantages:

By pre-establishing a node quality score table, which comprises a mapping relation between each of physical scenes and quality scores of a plurality of types of CDN nodes, it is possible to determine, in accordance with a target physical scene corresponding to a target network request, target quality scores of the plurality of types of CDN nodes corresponding to the target physical scene after the target network request is received. The quality of the plurality of types of CDN nodes is evaluated in accordance with the target quality scores of the plurality of types of CDN nodes to obtain a quality evaluation result. For example, the quality of the CDN nodes of different vendors in the target physical scene is evaluated. In turn, it is possible to select a CDN node with the highest quality from candidate CDN nodes, to process the target network request through the selected candidate CDN node. It can be seen that in the present application, in accordance with the physical scenes where different users encounter, the CDN node with the highest quality corresponding to the physical scene is selected for the user, thereby fully considering a difference in influences of the CDNs of different vendors on the terminal device in different physical scenes, and improving the service quality of the CDN node.

Figure 1:
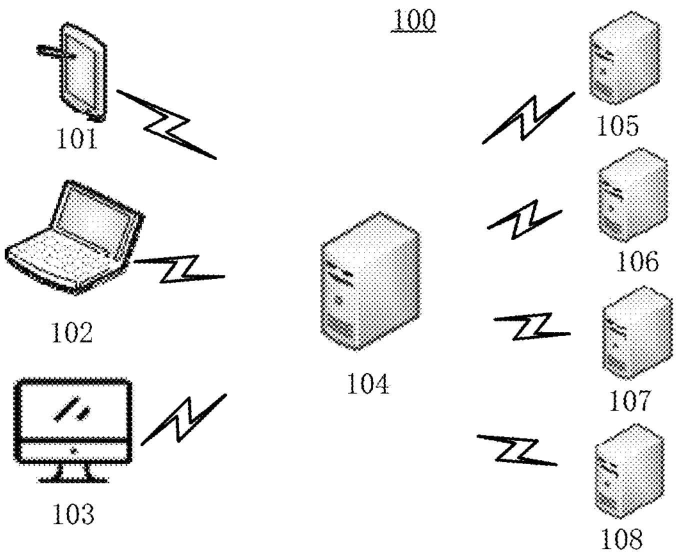
FIG. 1 illustrates a schematic diagram of a system architecture of an exemplary application environment to which a CDN node allocation method in accordance with an embodiment of the present application can be applied.

FIG. 1 illustrates a schematic diagram of a system architecture of an exemplary application environment to which a CDN node allocation method in accordance with an embodiment of the present application can be applied.

As shown in FIG. 1, the system architecture 100 may include one or more of terminal devices 101, 102, and 103, a server 104, and more than one of CDN nodes 105, 106, 107, and 108. The system architecture 100 may also include a network, for providing communication link medium between the terminal devices 101, 102, 103 and the server 104, and between the server 104 and the CDN nodes 105, 106, 107, 108. The network may include various connection types, such as wired or wireless communication links, fiber optic cables, or the like. The terminal devices 101, 102, 103 may be various electronic devices, including, but not limited to, desktop computers, portable computers, smartphones, tablets, and the like. It should be understood that the terminal device, network, CDN node, and server in FIG. 1 are merely illustrative in number. In accordance with implementation requirements, there can be any number of terminal devices, networks, CDN nodes, and servers. For example, the server 104 can be a server cluster formed by a plurality of servers or the like.

The CDN node allocation method provided in the embodiment of the present application is generally executed by the server 104, and accordingly, a CDN node allocation apparatus may be provided in the server 104. For example, the server 104 may pre-establish a node quality score table, and after receiving a target network request transmitted by the terminal device 101, allocate a CDN node for the target network request based on the CDN node allocation method of the embodiment of the present application. Assuming that the CDN node 105, the CDN node 106, the CDN node 107, and the CDN node 108 are four types of candidate CDN nodes, respectively a first-type CDN node, a second-type CDN node, a third-type CDN node, and a fourth-type CDN node, and in accordance with the node quality score table, it is determined that the second-type CDN node has the highest quality in a target physical scene corresponding to the target network request, then the target network request is transmitted to the CDN node 106, to process the target network request through the CDN node 106, and transmit requested data to the terminal device 101. The CDN node with the highest quality is selected for the terminal device in different physical scenes, so that the service quality of the CDN node can be improved.

First, a CDN node allocation method of an embodiment of the present application is described in detail below.

Figure 2:
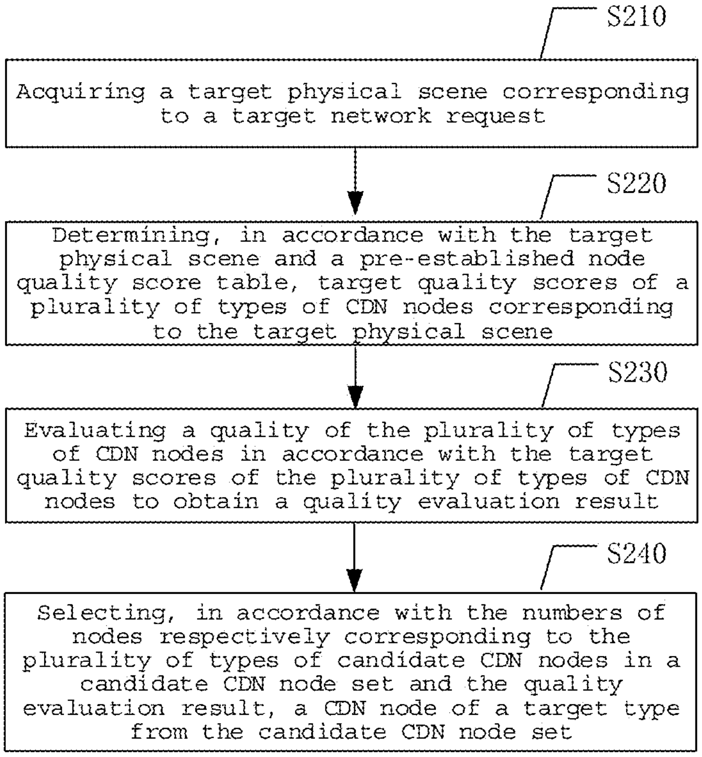
FIG. 2 is a flowchart of a CDN node allocation method in an embodiment of the present application.

Referring to FIG. 2, FIG. 2 is a flowchart of a CDN node allocation method in an embodiment of the present application, which may include the following steps:

step S210, acquiring a target physical scene corresponding to a target network request.

When a user accesses a webpage through a terminal device, the terminal device can transmit a corresponding network request. The target network request may be a video playing request, a data downloading request, or the like. Given that request types of the target network request are different, the corresponding target physical scenes can also be different. For example, given that a target network request is a data downloading request, the target physical scene corresponding to the target network request includes one or more of: a network type, a network operator, and a province.

When the target network request is a video playing request, video popularity has a great influence on the service quality of the CDN node, for example, a more popular video more tends to be stored on the CDN node, whereas an unpopular video might not be stored on the CDN node due to a smaller number of views, so that a video playing request is more prone to being forwarded to the source station, which might cause a longer first screen time and more lags, and lower video playing quality. Therefore, the video popularity may be used as a reference factor in the physical scene. The video popularity can be counted using a relative number of playing times, that is, the number of playing times of a video within one hour is counted, videos are ranked in accordance with the number of playing times, and videos ranked in the top 1% are taken as popular videos and other videos are taken as unpopular videos.

Similarly, the video bitrate (e.g. 720p, 540p, 480p) and the startup type (cold startup or hot startup) have a great influence on the service quality of the CDN node, and the video bitrate and the startup type can also be used as reference factors in the physical scene. The cold startup refers to that, when an application software is started up, there is no process of this application in the background, and the hot startup refers to that, when an application software is started up, there is a process of this application in the background. Optionally, the target physical scene corresponding to the target network request may include one or more of video popularity, a video bitrate, a startup type, a network type, a network operator, and a province.

Step S220, determining, in accordance with the target physical scene and a pre-established node quality score table, target quality scores of a plurality of types of CDN nodes corresponding to the target physical scene.

In the embodiment of the present application, the node quality score table is pre-established in accordance with historical network data, and comprises a mapping relation between each of physical scenes and quality scores of the plurality of types of CDN nodes, for evaluating the plurality of types of CDN nodes in different physical scenes. The plurality of types of CDN nodes may be the CDN nodes of a plurality of different vendors, or different types of CDN nodes of the same vendor, or different types of CDN nodes of a plurality of different vendors.

In order to improve accuracy of the node quality score table, the historical network data used when the node quality score table is established may be latest network data to the present, for example, network data within a latest half hour. Of course, the node quality score table can also be continuously updated later to improve the accuracy of the node quality score table.

It can be understood that, when the node quality score table is established, the more reference factors in the physical scene, the higher accuracy of determining the target quality scores of the plurality of types of CDN nodes corresponding to the target physical scene in accordance with the node quality score table. Therefore, it is possible to refer to more reference factors to establish the node quality score table; and the establishment process of the node quality score table will be described in detail below and will not be described in detail herein.

Step S230, evaluating a quality of the plurality of types of CDN nodes in accordance with the target quality scores of the plurality of types of CDN nodes to obtain a quality evaluation result.

By comparing the target quality scores of the plurality of types of CDN nodes, a quality ranking result of the plurality of types of CDN nodes can be obtained, so that which type of CDN node(s) has a higher quality and which type of CDN node(s) has a lower quality can be known.

Assuming that there are three types of CDN nodes, namely a first-type CDN node, a second-type CDN node, and a third-type CDN node, and the corresponding target quality scores are 6.8, 3.7, and 5.6, respectively, wherein the lower the target quality score, the higher quality of the CDN node is indicated, so that it can be determined that the second-type CDN node has the highest quality, the third-type CDN node has the median quality, and the first-type CDN node has the lowest quality.

Step S240, selecting, in accordance with the numbers of nodes respectively corresponding to the plurality of types of candidate CDN nodes in a candidate CDN node set and the quality evaluation result, a CDN node of a target type from the candidate CDN node set.

The candidate CDN node set contains a plurality of types of candidate CDN nodes, each type of candidate CDN nodes has a corresponding number of nodes, and the candidate CDN node of the target type can be selected from the candidate CDN node set, wherein the candidate CDN node of the target type has the highest quality. The target type is determined from the above step S230. If the number of nodes of the CDN node of the target type is a plurality, any one of them can be selected. For example, for the first-type CDN node, the second-type CDN node, and the third-type CDN node described above, the second-type CDN node can be selected. Through verification, the present application can make the first screen time reduced by 1.2%, the lag duration reduced by 5.1%, and the number of lags reduced by 5.4%.

After the CDN node of the target type is selected, the requested data corresponding to the target network request can be acquired through the CDN node of the target type, and the requested data is returned to the terminal device.

In accordance with the CDN node allocation method of the embodiment of the present application, by pre-establishing the node quality score table, which comprises a mapping relation between each of physical scenes and quality scores of a plurality of types of CDN nodes, it is possible to determine, in accordance with the target physical scene corresponding to the target network request, target quality scores of the plurality of types of CDN nodes corresponding to the target physical scene after the target network request is received. The quality of the plurality of types of CDN nodes is evaluated in accordance with the target quality scores of the plurality of types of CDN nodes to obtain a quality evaluation result. For example, the quality of the CDN nodes of different vendors in the target physical scene is evaluated. In turn, it is possible to select the CDN node with the highest quality from candidate CDN nodes, to process the target network request through the selected candidate CDN node. It can be seen that in the present application, in accordance with the physical scenes which different users encounter, the CDN node with the highest quality corresponding to the physical scene is selected for the user, thereby fully considering a difference in influences of CDNs of the different vendors on the terminal device in different physical scenes, and improving the service quality of the CDN node.

Figure 3:
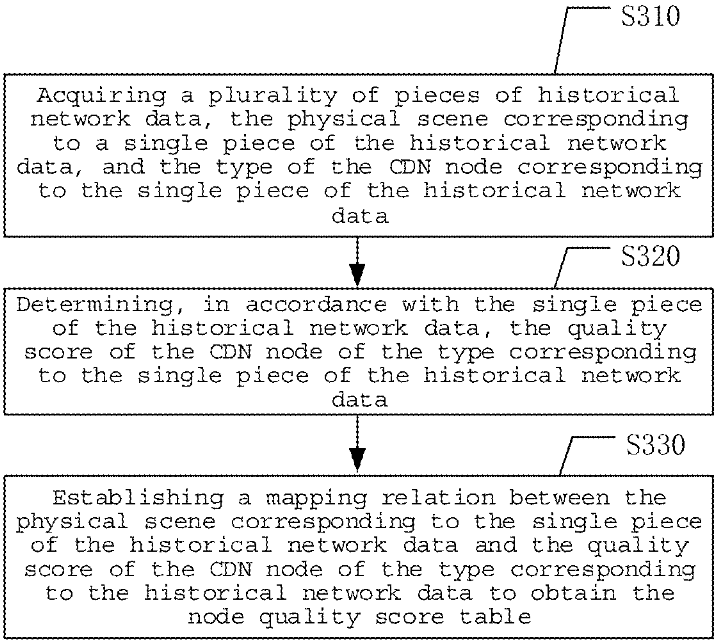
FIG. 3 is a flowchart of an establishment method for a node quality score table in an embodiment of the present application.

Referring to FIG. 3, FIG. 3 is a flowchart of an establishment method for a node quality score table in an embodiment of the present application, which may include the following steps: step S310, acquiring a plurality of pieces of historical network data, the physical scene corresponding to a single piece of the historical network data, and the type of the CDN node corresponding to the single piece of the historical network data.

The quality score for the CDN node may be determined based on network data corresponding to the network request, and different types of network requests correspond to different network data. Since physical scenes and the quality scores of the plurality of types of CDN nodes are to be established, the physical scene corresponding to a single piece of the historical network data and the type of the CDN node corresponding to the single piece of the historical network data may be acquired, wherein the single piece of the historical network data corresponds to one type of the CDN node(s), and a plurality of pieces of historical network data may correspond to a plurality of different types of CDN nodes. In this way, the type of the CDN node(s) corresponding to the physical scene may be determined. Further, by determining a quality score of the CDN node(s) of the type, a correspondence between the physical scene and the quality score of the CDN node(s) of the type may be obtained.

Step S320, determining, in accordance with the single piece of the historical network data, the quality score of the CDN node of the type corresponding to the single piece of the historical network data.

It can be understood that, for different types of network data, an index for evaluating the quality of the CDN node may also be different in general. Optionally, the historical network data includes historical video data; the quality of the video data may be determined in accordance with a first screen time, a lag duration, the number of lags, and other indexes of the video data, and since the quality of the video data can reflect the quality of the CDN node, the quality of the CDN node can be represented by the quality of the video data.

Optionally, a first screen time and/or a lag duration and/or the number of lags of the single piece of the historical video data may be acquired in accordance with the single piece of the historical video data, and the quality score of the CDN node of the type corresponding to the historical video data may be determined in accordance with the first screen time and/or the lag duration and/or the number of lags. The first screen time refers to a time consumed by a browser displaying a first screen page, and the longer the first screen time, the lower quality of the video data is indicated. The lag duration can be a hundred-second lag duration, etc., and the hundred-second lag duration refers to a product of a ratio of a sum of lag durations to a view duration within a video and 100, and the longer the hundred-second lag duration, the lower quality of the video data is indicated. The number of lags may be a hundred-second lag number, which refers to a product of a ratio of the number of lags to a view duration within a video and 100. The more number of lags, the lower quality of the video data is indicated.

Optionally, weighted average may be performed on the first screen time, the lag duration, and the number of lags to obtain the quality score of the CDN node of the type corresponding to the historical video data. For example, the quality score of the CDN node of the type corresponding to the historical video data may be equal to the first screen time+$\alpha$* the lag duration+$\beta$* the number of lags, wherein values of $\alpha$ and $\beta$ may be determined empirically.

Or, the first screen time, the lag duration, and the number of lags may be processed based on a pre-trained neural network score model, to obtain the quality score of the CDN node of the type corresponding to the historical video data. A training method for the neural network score model may be the following method wherein a plurality of pieces of sample videos corresponding to the plurality of types of CDN nodes are acquired, a first screen time, a lag duration, and the number of lags of each piece of sample video data are acquired as inputs, label data may be determined in accordance with a view duration of the sample video data, and the neural network score model is trained and generated.

Step S330, establishing the mapping relation between the physical scene corresponding to the single piece of the historical network data and the quality score of the CDN node of the type corresponding to the historical network data to obtain the node quality score table.

After the type of the CDN node corresponding to the single piece of the historical network data and the quality score of the CDN node of the type are determined, the mapping relation between the physical scene corresponding to the single piece of the historical network data and the quality score of the CDN node of the type may be established. Through the single piece of the historical network data, the mapping relation between one physical scene and the quality score of the CDN node of one type can be established. Through the plurality of pieces of historical network data, the mapping relation between one same physical scene and the quality scores of the corresponding plurality of types of CDN nodes can be obtained, thereby obtaining the node quality score table.

After the node quality score table is generated, it is possible to determine the quality scores of the plurality of types of CDN nodes directly in accordance with the physical scene corresponding to the network request after the network request is received, thereby evaluating the quality of the plurality of types of CDN nodes to select a CDN node of a type that has the highest quality.

Figure 4:
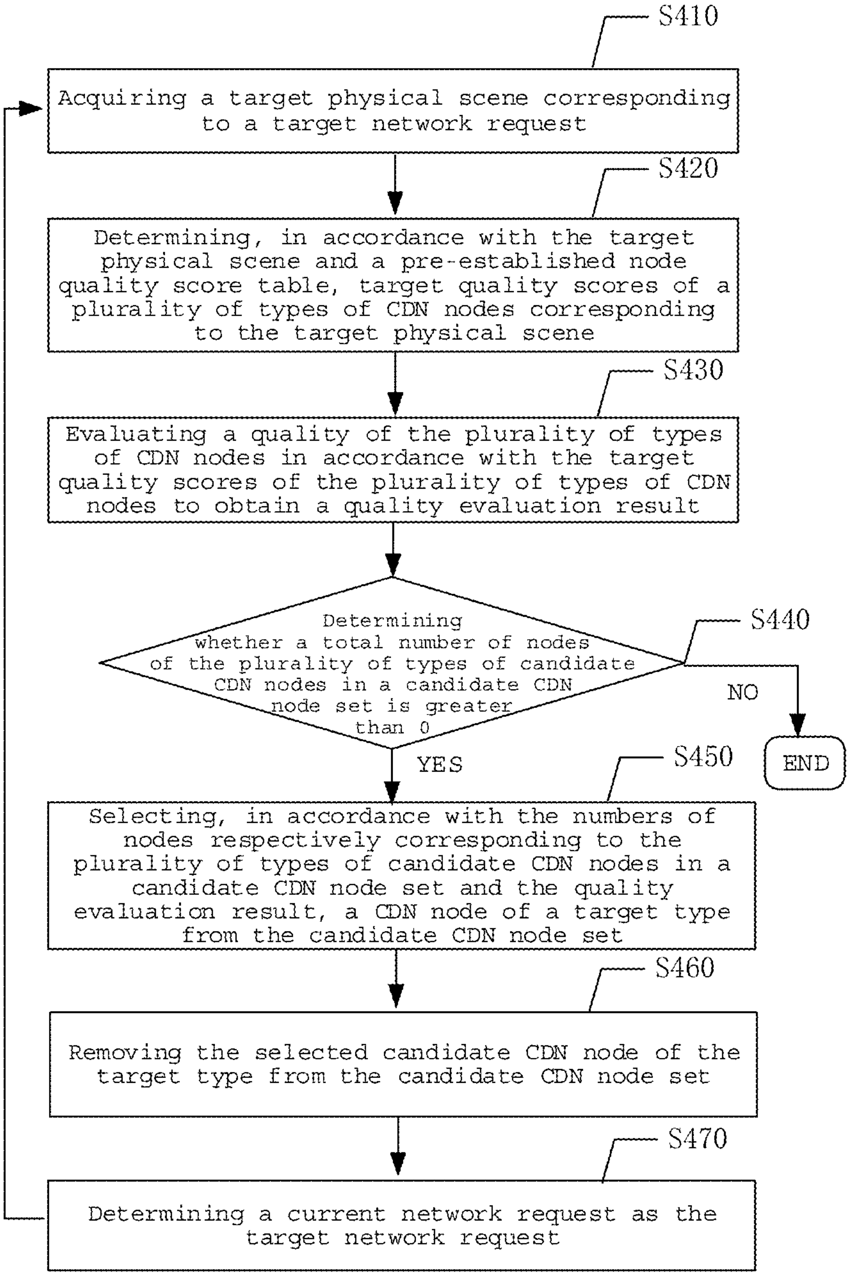
FIG. 4 is another flowchart of a CDN node allocation method in an embodiment of the present application.

Referring to FIG. 4, FIG. 4 is another flowchart of a CDN node allocation method in an embodiment of the present application, which may include the following steps:

step S410, acquiring a target physical scene corresponding to a target network request.

In an actual scene, a plurality of different terminal devices usually will access a same website, and at this time, the plurality of terminal devices all will transmit target network requests, or a same device can transmit a plurality of target network requests at different times, and a server can process the plurality of target network requests separately through the following loop process.

Step S420, determining, in accordance with the target physical scene and a pre-established node quality score table, target quality scores of a plurality of types of CDN nodes corresponding to the target physical scene, wherein the node quality score table comprises a mapping relation between each of physical scenes and quality scores of the plurality of types of CDN nodes.

Step S430, evaluating a quality of the plurality of types of CDN nodes in accordance with the target quality scores of the plurality of types of CDN nodes to obtain a quality evaluation result.

Step S440, determining whether a total number of nodes of the plurality of types of candidate CDN nodes in a candidate CDN node set is greater than 0.

The candidate CDN node set may be pre-assigned with a plurality of types of CDN nodes, and each type of CDN nodes corresponds to a certain number of nodes. Different types of CDN nodes will have different costs due to performance differences, so that on the premise of not increasing the cost, a CDN node with the highest quality can be selected for each terminal device. Optionally, it is possible to determine the numbers of nodes respectively corresponding to the plurality of types of candidate CDN nodes in the candidate CDN node set in accordance with overall quality of the plurality of types of CDN nodes and cost information (for example, price, etc.) of the plurality of types of CDN nodes. It should be noted that the overall quality is obtained by performing an overall evaluation on the plurality of types of CDN nodes, and might differ slightly from the quality of the corresponding plurality of types of CDN nodes in different physical scenes. For example, the overall quality of a first-type CDN node is the highest, but a corresponding quality score of the first-type CDN node in a certain physical scene might not be the highest.

For example, a candidate CDN node set includes three types of candidate CDN nodes, namely, a first-type candidate CDN node, a second-type candidate CDN node, and a third-type candidate CDN node, whose corresponding overall quality and cost information decrease sequentially; and, on the premise of not increasing the cost, the corresponding number of nodes may be 1000, 2000, and 7000, respectively, and a total number of nodes of the plurality of types of candidate CDN nodes in the candidate CDN node set is 10000.

If the total number of nodes of the plurality of types of candidate CDN nodes in the candidate CDN node set is greater than 0, it is indicated that there is currently still a candidate CDN node that can be selected, and the following step S450 may be performed; and if the total number of nodes of the plurality of types of candidate CDN nodes in the candidate CDN node set is equal to 0, it is indicated that there is currently no candidate CDN node that can be selected, so that the process ends. Alternatively, after a new candidate CDN node is added into the candidate CDN node set, the following step S450 can be continued.

Step S450, selecting, in accordance with the numbers of nodes respectively corresponding to the plurality of types of candidate CDN nodes in the candidate CDN node set and the quality evaluation result, a CDN node of a target type from the candidate CDN node set, wherein the candidate CDN node of the target type has the highest quality.

Before the candidate CDN node is selected from the candidate CDN node set, the numbers of nodes corresponding to the first-type candidate CDN node, the second-type candidate CDN node, and the third-type candidate CDN node 2000, and 7000, respectively, and at this time, a candidate CDN node of a type that has the highest quality may be directly selected.

Assuming that after a plurality of loops, a plurality of candidate CDN nodes have been selected from the candidate CDN node set, and the numbers of nodes corresponding to the first-type candidate CDN node, the second-type candidate CDN node, and the third-type candidate CDN node are 50, 0, and 1000, respectively, even if it is determined in the step S430 that the second-type CDN node has the highest quality, the second-type candidate CDN node cannot be selected because the number of nodes of the second-type candidate CDN node in the candidate CDN node set is 0. If it is determined in accordance with the step S430 that the quality of the first-type CDN node is higher than that of the third-type CDN node, one of the remaining 50 first-type candidate CDN nodes can be selected.

Step S460, removing the selected candidate CDN node of the target type from the candidate CDN node set.

After each selection is completed, the selected candidate CDN node may be removed from the candidate CDN node set, so that this candidate CDN node cannot be selected next time.

Step S470, determining a current network request as the target network request, and returning to the step S410 until the total number of candidate CDN nodes is 0.

In accordance with the CDN node allocation method of the embodiment of the present application, by pre-establishing a node quality score table, which comprises a mapping relation between each of physical scenes and quality scores of a plurality of types of CDN nodes, it is possible to determine, in accordance with a target physical scene corresponding to each target network request, target quality scores of the plurality of types of CDN nodes corresponding to each target physical scene after each target network request is received. The quality of the plurality of types of CDN nodes is evaluated in accordance with the target quality scores of the plurality of types of CDN nodes to obtain a quality evaluation result. For example, the quality of the CDN nodes of different vendors in the target physical scene is evaluated. In turn, it is possible to select a candidate CDN node with the highest quality from a candidate CDN node set, to process the target network request through the selected candidate CDN node. The numbers of nodes of the candidate CDN node of each type in the candidate CDN node set can be determined in accordance with the overall quality and cost information of the candidate CDN node of each type, and therefore it is possible to select, in accordance with the physical scenes where different users encounter, the CDN node with the highest quality corresponding to the physical scene for the user without increasing cost, thereby fully considering a difference in influences of the CDNs of different vendors on the terminal device in different physical scenes, and improving the service quality of the CDN node.

Figure 5:
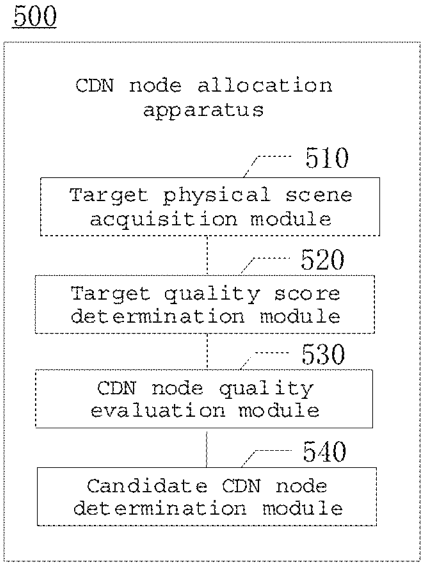
FIG. 5 is a schematic structural diagram of a CDN node allocation apparatus in an embodiment of the present application.

Corresponding to the above method embodiment, an embodiment of the present application further provides a CDN node allocation apparatus, by referring to FIG. 5, the CDN node configuration apparatus 500 including:

a target physical scene acquisition module 510 configured to acquire a target physical scene corresponding to a target network request;

a target quality score determination module 520 configured to determine, in accordance with the target physical scene and a pre-established node quality score table, target quality scores of a plurality of types of CDN nodes corresponding to the target physical scene, wherein the node quality score table comprises a mapping relation between each of physical scenes and quality scores of the plurality of types of CDN nodes;

a CDN node quality evaluation module 530 configured to evaluate a quality of the plurality of types of CDN nodes in accordance with the target quality scores of the plurality of types of CDN nodes to obtain a quality evaluation result; and a candidate CDN node determination module 540 configured to select, in accordance with the numbers of nodes respectively corresponding to the plurality of types of candidate CDN nodes in a candidate CDN node set and the quality evaluation result, a CDN node of a target type from the candidate CDN node set, wherein the candidate CDN node of the target type has the highest quality.

Optionally, the CDN node allocation apparatus 500 further includes:

a data acquisition module configured to acquire a plurality of pieces of historical network data, the physical scene corresponding to a single piece of the historical network data, and the type of the CDN node corresponding to the single piece of the historical network data;

a quality score determination module configured to determine, in accordance with the single piece of the historical network data, the quality score of the CDN node of the type corresponding to the single piece of the historical network data; and a node quality score table generation module configured to establish a mapping relation between the physical scene corresponding to the single piece of the historical network data and the quality score of the CDN node of the type corresponding to the historical network data to obtain the node quality score table.

Optionally, the e historical network data includes historical video data; and the quality score determination module is specifically configured to acquire, in accordance with the single piece of the historical video data, a first screen time and/or a lag duration and/or the number of lags of the single piece of the historical video data; and determine, in accordance with the first screen time and/or the lag duration and/or the number of lags, the quality score of the CDN node of the type corresponding to the historical video data.

Optionally, the quality score determination module determines the quality score of the CDN node of the type corresponding to the historical video data in accordance with the first screen time, the lag duration, and the number of lags by the steps of:

performing weighted average on the first screen time, the lag duration, and the number of lags to obtain the quality score of the CDN node of the type corresponding to the historical video data; or, processing, based on a pre-trained neural network score model, the first screen time, the lag duration, and the number of lags to obtain the quality score of the CDN node of the type corresponding to the historical video data.

Optionally, the CDN node allocation apparatus 500 further includes:

a node removal module configured to remove the selected candidate CDN node of the target type from the candidate CDN node set; and a loop module configured to determine a current network request as the target network request and return to the target physical scene acquisition module until a total number of the candidate CDN nodes is 0.

Optionally, the CDN node allocation apparatus 500 further includes:

a node number determination module configured to determine, in accordance with overall quality of the plurality of types of CDN nodes and cost information of the plurality of types of CDN nodes, the numbers of nodes respectively corresponding to the plurality of types of candidate CDN nodes in the candidate CDN node set.

Optionally, the CDN node allocation apparatus further includes:

a requested data acquisition module configured to acquire requested data corresponding to the target network request through the CDN node of the target type; and a requested data transmission module configured to return the requested data to a terminal device.

Optionally, the target network request is a video playing request, and the target physical scene corresponding to the target network request comprises one or more of video popularity, a video bitrate, a startup type, a network type, and a network operator.

The specific details of each module or unit in the above apparatus have been described in detail in the corresponding method, and therefore are not repeated here.

It should be noted that although several modules or units of the device for action execution are mentioned in the above detailed description, this division is not mandatory. Indeed, in accordance with the embodiments of the present application, features and functions of two or more modules or units described above may be embodied in one module or unit. Conversely, features and functions of one module or unit described above may be further divided into a plurality of modules or units for the embodiment.

In an exemplary embodiment of the present application, there is further provided an electronic device, comprising: a processor; a memory for storing processor-executable instructions, wherein the processor is configured to perform the above CDN node allocation method in this example embodiment.

Figure 6:
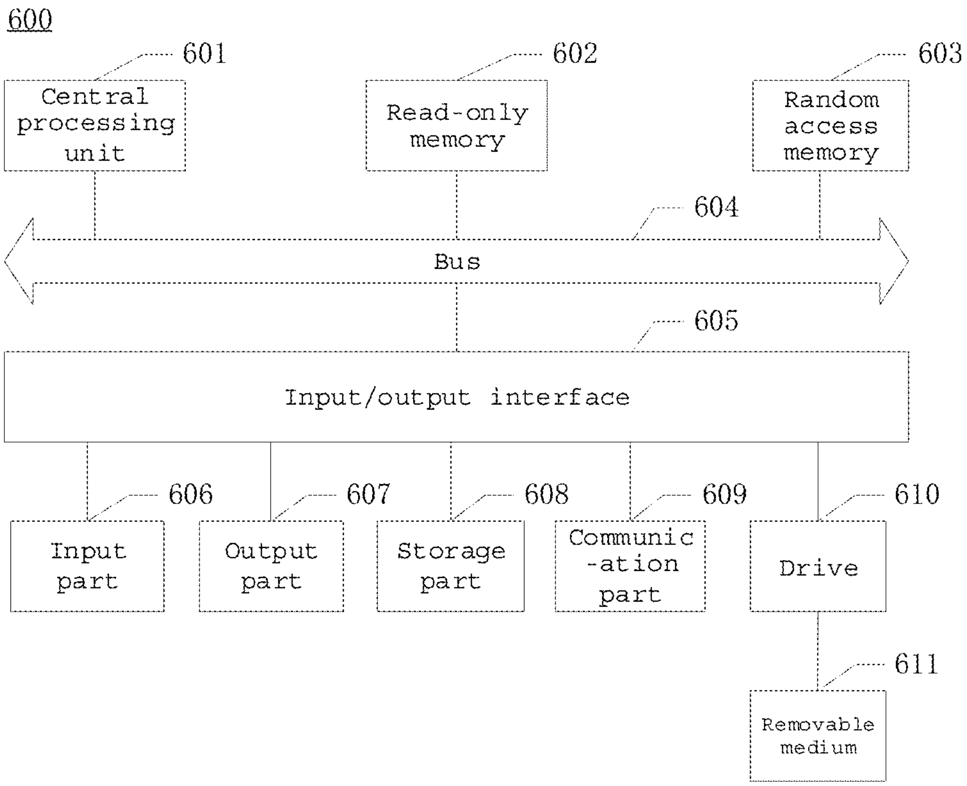
FIG. 6 is a schematic structural diagram of an electronic device in an embodiment of the present application.

FIG. 6 is a schematic structural diagram of an electronic device in an embodiment of the present application. It should be noted that the electronic device 600 shown in FIG. 6 is only an example, and should not bring any limitation to the functions and the usage scope of the embodiment of the present application. The electronic device in the embodiment of the present application may include, but is not limited to, a mobile terminal such as a mobile phone, notebook computer, digital broadcast receiver, PDA (Personal Digital Assistant), PAD (tablet computer), PMP (Portable Multimedia Player), and vehicle-mounted terminal (e.g., vehicle-mounted navigation terminal), and a fixed terminal such as a digital TV and desktop computer.

As shown in FIG. 6, the electronic device 600 comprises a central processing unit (CPU) 601, which can perform various appropriate actions and processes in accordance with a program stored in a read-only memory (ROM) 602 or a program loaded from a storage part 608 into a random access memory (RAM) 603. In the RAM 603, various programs and data required for the system operation are also stored. The central processing unit 601, ROM 602, and RAM 603 are connected to each other via a bus 604. An input/output (I/O) interface 605 is also connected to the bus 604.

The following components are connected to the I/O interface 605: an input part 606 including a keyboard, a mouse, and the like; an output part 607 including a cathode ray tube (CRT), a liquid crystal display (LCD), a speaker, and the like; the storage part 608 including a hard disk and the like; and a communication part 609 including a network interface card such as a local area network (LAN) card and a modem. The communication part 609 performs communication processing via a network such as the Internet. A drive 610 is also connected to the I/O interface 605 as needed. A removable medium 611 such as a magnetic disk, an optical disk, a magneto-optical disk, and a semiconductor memory is mounted on the drive 610 as needed, in order that a computer program read out therefrom is installed into the storage part 608 as needed.

In particular, in accordance with an embodiment of the present application, the processes described above with reference to the flowcharts may be implemented as a computer software program. For example, an embodiment of the present application comprises a computer program product, which comprises a computer program carried on a computer-readable medium, the computer program comprising program code for performing the method illustrated by the flowcharts. In such an embodiment, the computer program may be downloaded and installed from a network through the communication part 609 and/or installed from the removable medium 611. When the computer program is executed by the central processing unit 601, various functions defined in the apparatus of the present application are executed.

In an embodiment of the present application, there is further provided a computer-readable storage medium having stored thereon a computer program which, when executed by a processor, implements the CDN node allocation method above.

In an embodiment of the present application, there is further provided a computer program which, when executed by a processor, implements the CDN node allocation method above.

It should be noted that the computer-readable storage medium shown in the present application can be, for example, but not limited to, an electronic, magnetic, optical, electromagnetic, infrared, or semiconductor system, apparatus, or device, or any combination of the above. More specific examples of the computer-readable storage medium may include, but are not limited to: an electrical connection having one or more wires, a portable computer diskette, a hard disk, a random access memory, a read-only memory, an erasable programmable read-only memory (EPROM or flash memory), an optical fiber, a portable compact disc read-only memory (CD-ROM), an optical storage device, a magnetic storage device, or any suitable combination of the foregoing. In the present application, the computer-readable storage medium may be any tangible medium that contains or stores a program which may be used by or in conjunction with an instruction execution system, apparatus, or device. Program code contained on the computer-readable storage medium may be transmitted using any appropriate medium, including but not limited to: radio, a wire, an optic cable, radio frequency, etc., or any suitable combination of the foregoing.

In an embodiment of the present application, there is further provided a computer program product which, when executed on a computer, causes the computer to perform the CDN node allocation method above.

It should be noted that, relational terms such as "first" and "second", herein, are only used for distinguishing one entity or operation from another entity or operation without necessarily requiring or implying any such actual relation or order between these entities or operations. Moreover, the term "comprise", "include", or any other variation thereof, is intended to encompass a non-exclusive inclusion, such that a process, method, article, or device comprising a list of elements not only includes those elements but also includes other elements not expressly listed, or also includes elements inherent to such a process, method, article, or device. Without more limitations, an element defined by a statement "comprising a . . . " does not exclude the presence of another identical element in the process, method, article, or device that includes the element.

The above only describes specific implementations of the present disclosure, which enable those skilled in the art to understand or implement the present application. Various modifications to these embodiments will be apparent to those skilled in the art, and the general principles defined herein may be implemented in other embodiments without departing from the spirit or scope of the present application. Therefore, the present application will not be limited to these embodiments described herein, but conform to the widest scope consistent with the principles and novel features disclosed herein.

What is claimed is:

1. A content delivery network (CDN) node allocation method, comprising:

acquiring a first physical scene corresponding to a first network request;

determining, in accordance with the first physical scene and a pre-established node quality score table, first quality scores of a plurality of types of CDN nodes corresponding to the first physical scene, wherein the pre-established node quality score table comprises a mapping relation between the first physical scene and the first quality scores of the plurality of types of CDN nodes, the plurality of types of CDN nodes comprise CDN nodes of a plurality of different CDN providers, and a quality score of a single type of CDN node corresponding to the first physical scene is determined based on historical network data acquired by the single type of CDN node under the first physical scene;

evaluating a quality of the plurality of types of CDN nodes in accordance with the first quality scores of the plurality of types of CDN nodes to obtain a quality evaluation result; and selecting, in accordance with numbers of nodes respectively corresponding to a plurality of types of candidate CDN nodes in a candidate CDN node set and the quality evaluation result, a CDN node of a first type from the candidate CDN node set, wherein the CDN node of the first type has the highest quality, wherein the first network request is a video playback request, and the first physical scene corresponding to the first network request comprises video popularity, a video bitrate, and a startup type of a video on a corresponding CDN node.

2. The method according to claim 1, wherein the method further comprises:

acquiring a plurality of pieces of historical network data, the physical scene corresponding to a single piece of the historical network data, and the type of the CDN node corresponding to the single piece of the historical network data;

determining, in accordance with the single piece of the historical network data, the quality score of the CDN node of the type corresponding to the single piece of the historical network data; and establishing a mapping relation between the physical scene corresponding to the single piece of the historical network data and the quality score of the CDN node of the type corresponding to the historical network data to obtain the pre-established node quality score table.

3. The method according to claim 2, wherein the historical network data comprises historical video data; and determining, in accordance with the single piece of the historical network data, the quality score of the CDN node of the type corresponding to the single piece of the historical network data comprises:

acquiring, in accordance with the single piece of the historical video data, at least one of a first screen time, a lag duration, or the number of lags of the single piece of the historical video data; and determining, in accordance with the at least one of the first screen time, the lag duration, or the number of lags, the quality score of the CDN node of the type corresponding to the historical video data.

4. The method according to claim 3, wherein determining, in accordance with the at least one of the first screen time, the lag duration, or the number of lags, the quality score of the CDN node of the type corresponding to the historical video data comprises:

performing weighted average on the first screen time, the lag duration, and the number of lags to obtain the quality score of the CDN node of the type corresponding to the historical video data; or, processing, based on a pre-trained neural network score model, the first screen time, the lag duration, and the number of lags to obtain the quality score of the CDN node of the type corresponding to the historical video data.

5. The method according to claim 1, wherein the method further comprises:

removing the selected candidate CDN node of the first type from the candidate CDN node set; and determining a current network request as the first network request, and returning to the step of acquiring the first physical scene corresponding to the first network request, until a total number of the candidate CDN nodes is 0.

6. The method according to claim 1, wherein the method further comprises:

determining, in accordance with overall quality of the plurality of types of CDN nodes and cost information of the plurality of types of CDN nodes, the numbers of nodes respectively corresponding to the plurality of types of candidate CDN nodes in the candidate CDN node set.

7. The method according to claim 1, wherein the method further comprises:

acquiring requested data corresponding to the first network request through the CDN node of the first type, and returning the requested data to a terminal device which has transmitted the first network request.

8. An electronic device, comprising: at least one processor configured to execute a computer program stored in at least one memory, wherein the computer program, when executed by the at least one processor, implements following content delivery network (CDN) node allocation operations:

acquiring a first physical scene corresponding to a first network request;

determining, in accordance with the first physical scene and a pre-established node quality score table, first quality scores of a plurality of types of CDN nodes corresponding to the first physical scene, wherein the pre-established node quality score table comprises a mapping relation between the first physical scene and the first quality scores of the plurality of types of CDN nodes, the plurality of types of CDN nodes comprise CDN nodes of a plurality of different CDN providers, and a quality score of a single type of CDN node corresponding to the first physical scene is determined based on historical network data acquired by the single type of CDN node under the first physical scene;

evaluating a quality of the plurality of types of CDN nodes in accordance with the first quality scores of the plurality of types of CDN nodes to obtain a quality evaluation result; and selecting, in accordance with numbers of nodes respectively corresponding to a plurality of types of candidate CDN nodes in a candidate CDN node set and the quality evaluation result, a CDN node of a first type from the candidate CDN node set, wherein the CDN node of the first type has the highest quality, wherein the first network request is a video playback request, and the first physical scene corresponding to the first network request comprises video popularity, a video bitrate, and a startup type of a video on a corresponding CDN node.

9. A non-transitory computer-readable storage medium having stored thereon a computer program which, when executed by at least one processor, implements following content delivery network (CDN) node allocation operations:

acquiring a first physical scene corresponding to a first network request;

determining, in accordance with the first physical scene and a pre-established node quality score table, first quality scores of a plurality of types of CDN nodes corresponding to the first physical scene, wherein the pre-established node quality score table comprises a mapping relation between the first physical scene and the first quality scores of the plurality of types of CDN nodes, the plurality of types of CDN nodes comprise CDN nodes of a plurality of different CDN providers, and a quality score of a single type of CDN node corresponding to the first physical scene is determined based on historical network data acquired by the single type of CDN node under the first physical scene;

evaluating a quality of the plurality of types of CDN nodes in accordance with the first quality scores of the plurality of types of CDN nodes to obtain a quality evaluation result; and selecting, in accordance with numbers of nodes respectively corresponding to a plurality of types of candidate CDN nodes in a candidate CDN node set and the quality evaluation result, a CDN node of a first type from the candidate CDN node set, wherein the CDN node of the first type has the highest quality, wherein the first network request is a video playback request, and the first physical scene corresponding to the first network request comprises video popularity, a video bitrate, and a startup type of a video on a corresponding CDN node.

10. The electronic device according to claim 8, wherein the computer program, when executed by the at least one processor, further implements following operations:

acquiring a plurality of pieces of historical network data, the physical scene corresponding to a single piece of the historical network data, and the type of the CDN node corresponding to the single piece of the historical network data;

determining, in accordance with the single piece of the historical network data, the quality score of the CDN node of the type corresponding to the single piece of the historical network data; and establishing a mapping relation between the physical scene corresponding to the single piece of the historical network data and the quality score of the CDN node of the type corresponding to the historical network data to obtain the pre-established node quality score table.

11. The electronic device according to claim 10, wherein the historical network data comprises historical video data; and determining, in accordance with the single piece of the historical network data, the quality score of the CDN node of the type corresponding to the single piece of the historical network data comprises:

acquiring, in accordance with the single piece of the historical video data, at least one of a first screen time, a lag duration, or the number of lags of the single piece of the historical video data; and determining, in accordance with the at least one of the first screen time, the lag duration, or the number of lags, the quality score of the CDN node of the type corresponding to the historical video data.

12. The electronic device according to claim 11, wherein determining, in accordance with the at least one of the first screen time, the lag duration, or the number of lags, the quality score of the CDN node of the type corresponding to the historical video data comprises:

performing weighted average on the first screen time, the lag duration, and the number of lags to obtain the quality score of the CDN node of the type corresponding to the historical video data; or, processing, based on a pre-trained neural network score model, the first screen time, the lag duration, and the number of lags to obtain the quality score of the CDN node of the type corresponding to the historical video data.

13. The electronic device according to claim 8, wherein the computer program, when executed by the at least one processor, further implements following operations:

removing the selected candidate CDN node of the first type from the candidate CDN node set; and determining a current network request as the first network request, and returning to the step of acquiring the first physical scene corresponding to the first network request, until a total number of the candidate CDN nodes is 0.

14. The electronic device according to claim 8, wherein the computer program, when executed by the at least one processor, further implements following operation:

determining, in accordance with overall quality of the plurality of types of CDN nodes and cost information of the plurality of types of CDN nodes, the numbers of nodes respectively corresponding to the plurality of types of candidate CDN nodes in the candidate CDN node set.

15. The non-transitory computer-readable storage medium according to claim 9, wherein the computer program which, when executed by the at least one processor, further implements following operations:

acquiring a plurality of pieces of historical network data, the physical scene corresponding to a single piece of the historical network data, and the type of the CDN node corresponding to the single piece of the historical network data;

determining, in accordance with the single piece of the historical network data, the quality score of the CDN node of the type corresponding to the single piece of the historical network data; and establishing a mapping relation between the physical scene corresponding to the single piece of the historical network data and the quality score of the CDN node of the type corresponding to the historical network data to obtain the pre-established node quality score table.

16. The non-transitory computer-readable storage medium according to claim 15, wherein the historical network data comprises historical video data; and determining, in accordance with the single piece of the historical network data, the quality score of the CDN node of the type corresponding to the single piece of the historical network data comprises:

acquiring, in accordance with the single piece of the historical video data, at least one of a first screen time, a lag duration, or the number of lags of the single piece of the historical video data; and determining, in accordance with the at least one of the first screen time, the lag duration, or the number of lags, the quality score of the CDN node of the type corresponding to the historical video data.

17. The non-transitory computer-readable storage medium according to claim 16, wherein determining, in accordance with the at least one of the first screen time, the lag duration, or the number of lags, the quality score of the CDN node of the type corresponding to the historical video data comprises:

performing weighted average on the first screen time, the lag duration, and the number of lags to obtain the quality score of the CDN node of the type corresponding to the historical video data; or, processing, based on a pre-trained neural network score model, the first screen time, the lag duration, and the number of lags to obtain the quality score of the CDN node of the type corresponding to the historical video data.

18. The non-transitory computer-readable storage medium according to claim 9, wherein the computer program which, when executed by the at least one processor, further implements following operations:

removing the selected candidate CDN node of the first type from the candidate CDN node set; and determining a current network request as the first network request, and returning to the step of acquiring the first physical scene corresponding to the first network request, until a total number of the candidate CDN nodes is 0.

19. The non-transitory computer-readable storage medium according to claim 9, wherein the computer program which, when executed by the at least one processor, further implements following operation:

determining, in accordance with overall quality of the plurality of types of CDN nodes and cost information of the plurality of types of CDN nodes, the numbers of nodes respectively corresponding to the plurality of types of candidate CDN nodes in the candidate CDN node set.

* * * * *